March 27, 1928. 1,663,995
F. L. BRYANT
CONDENSER
Filed April 12, 1924  2 Sheets-Sheet 2

F. L. Bryant
INVENTOR

Patented Mar. 27, 1928.

1,663,995

UNITED STATES PATENT OFFICE.

FORREST L. BRYANT, OF BINGHAMTON, NEW YORK.

CONDENSER.

Application filed April 12, 1924. Serial No. 706,178.

This invention relates to the art of refrigeration and has for its object the provision of a refrigerating apparatus which entirely eliminates the use of ice and which employs ammonium hydroxide as its active agent, means being provided for producing the necessary liquefaction and expansion.

The essential feature lies in the provision of an apparatus of this character utilizing an absorption method for producing a constant circulation of the ammonia, electrically operated heating means being controlled automatically by a thermostatic closer and similar thermostatic means being provided in the brine tank whereby to make the entire mechanism automatic and continuous in action.

A further object is the provision of a device of this nature well adapted for construction on a small scale for domestic use.

Another object is the provision of an apparatus of this character including peculiar means for separating steam from the ammonia, this unit being interposed between the heating means and the condenser.

An additional object is the provision of a mechanism of this character which will be simple and inexpensive to manufacture, easy to install and operate, positive and efficient in service and a general improvement in the art.

With the above and other objects and advantages in view the invention consists in the details of construction to be hereinafter more fully described and claimed and illustrated in the accompanying drawings, in which:

Figure 1:
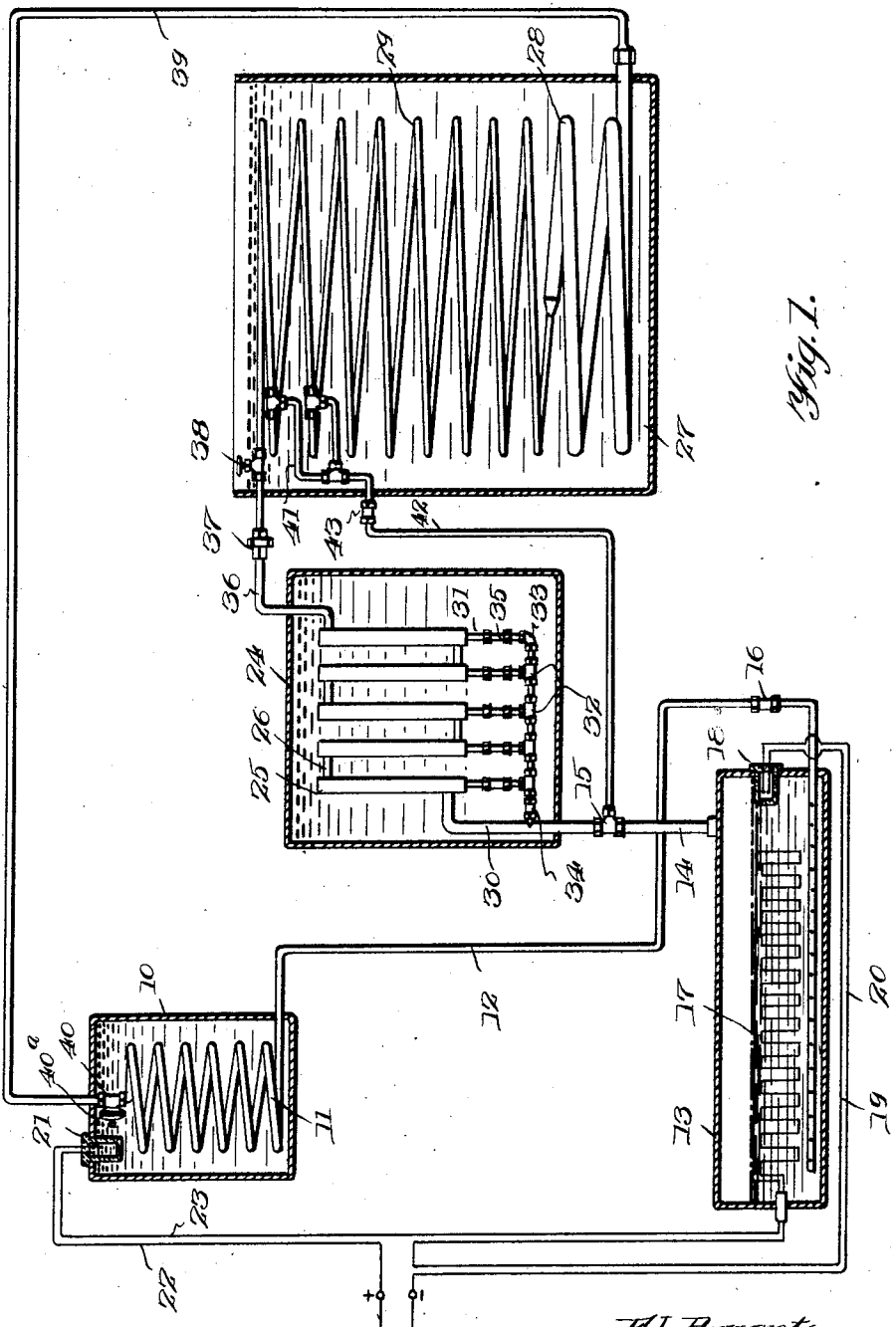
Figure 1 is a somewhat diagrammatic view showing my system and apparatus.
Figure 2:
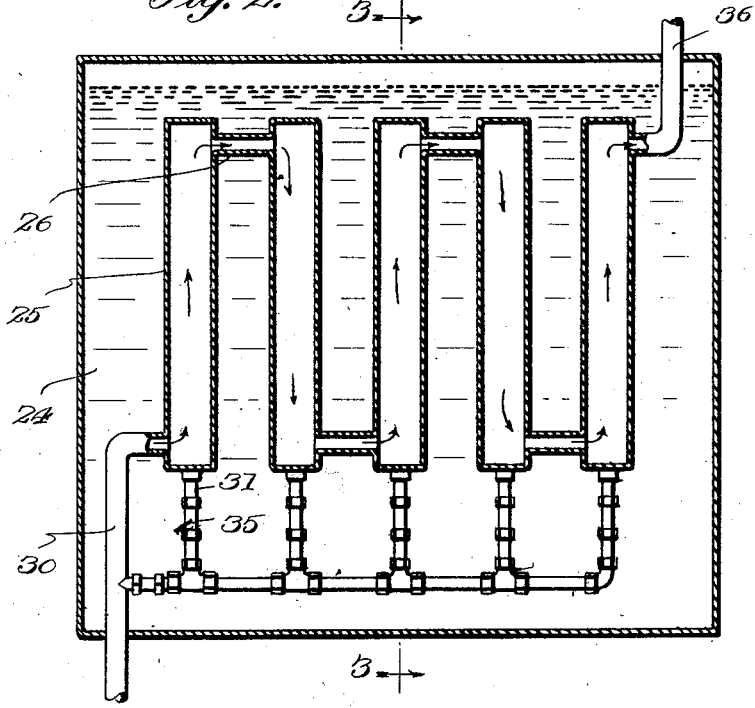
Figure 2 is a detail section through the separator.
Figure 3:
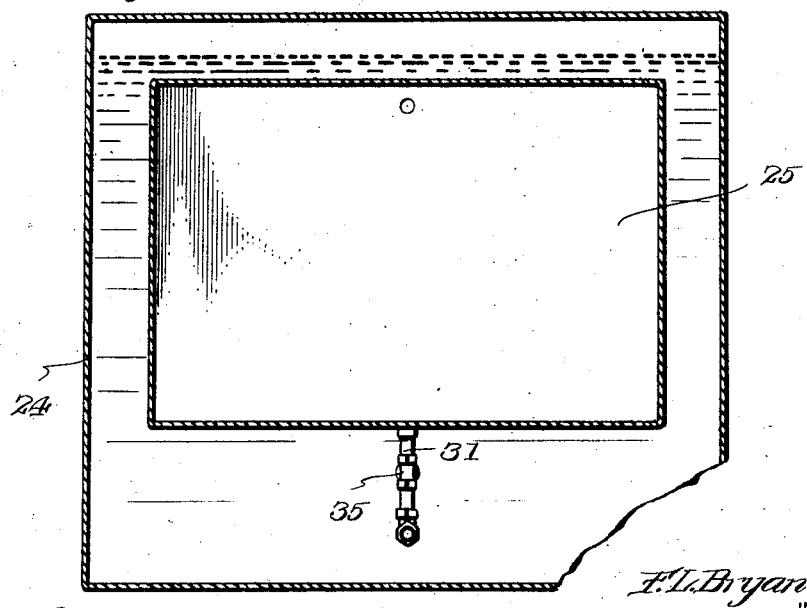
Figure 3 is a cross section on the line 3—3 of Figure 2.

Referring more particularly to the drawings the numeral 10 designates a brine tank within which is located an expansion coil 11 from the lower end of which leads a pipe 12. The numeral 13 designates a heating tank containing water and provided with an outlet pipe 14 having a joint 15 therein. The pipe 12 enters the tank 13 and extends therealong, near the bottom. The portion of the pipe 12 within the tank 13 is perforated on its underside while its end is plugged. A suitable check valve 16 is interposed in the pipe 12 for the purpose of preventing back pressure therethrough.

Within the tank 13 is an electric heater 17 of any ordinary or preferred type supplied with current from any suitable source. At one end of this tank is a thermostatic circuit closer 18 from which lead wires 19 and 20, the former of which is connected with one terminal of the heating coil 17, and the latter of which is connected with one pole of whatever source of current is used.

In the tank 10 is a thermostatic circuit closer 21 to which are connected wires 22 and 23, the former of which is connected with the other terminal of the source of current and the latter of which is connected with the other terminal of the heating coil 17. The arrangement and adjustment of these circuit closers is such that when the temperature of the water within the tank 13 drops below a certain degree, the circuit closer 18 will operate to close the circuit through the heater 17, and is furthermore such that when the temperature of the brine in the tank 10 reaches a certain low temperature, the thermostat 31 will open, breaking the circuit to the electric heater. Both thermostats thus act in unison and each is a check on the other.

I also provide a separating device including a tank 24 within which are located hollow members 25 connected by pipes 26 which are staggered as shown so as to provide a circuitous passage. Beyond the separator is the condenser which includes a tank 27 within the lower portion of which is a coil 28 of tubing of relatively large diameter serving as a receiver and receiving from a coil 29 formed of small diameter tubing which acts as a condenser. The first one of the series of hollow members 25 is connected with a pipe 30 which leads from the connection 15. At the bottoms of the hollow members 25 are drain tubes 31 connected with the pipe 30, by the T's and elbows 32 and 33 respectively. A check valve 34 is interposed between the pipe 30 and the pipes 31 for preventing back pressure and similar check valves 35 are provided in all of the tubes 31. The separator is designed to separate the water from the ammonia and does so very satisfactorily. However, in case there should by any chance be a small quantity of water getting past the separator, I have designed the condenser so that this moisture may be condensed in the first few convolutions and drained back to the boiler.

The endmost or last hollow member 25 has its top connected by a pipe 36 with the beginning of the coil 29, a suitable union 37 being provided. An automatic check valve 38 is provided at the beginning of the coil 29 for regulating passage of gas therethrough. The bottom of the receiving coil 28 has connected therewith a pipe 39 which leads into the brine tank 10 and which connects with the expansion coil 11 therein. At the juncture of the pipe 39 with the expansion coil is an automatic pressure reducing valve 40 of any ordinary or preferred type which will automatically operate to permit only a certain pressure to pass therethrough. This valve is equipped with a thermostatic device 40$^a$ which will operate to close the valve when the brine has reached a certain low temperature thereby preventing more liquid passing through.

Two or more of the uppermost convolutions of the coil 29 are equipped with drain tubes 41 which lead to a drain pipe 42 which connects with one of the branches of the joint 15. It is preferable that a check valve 43 be interposed in this pipe or tube 42 to prevent back pressure.

In the operation, assuming that the parts are constructed and arranged as described, and that the brine tank is full and that the tank 13 is filled with ammonium hydroxide and the system purged of air, the thermostats are both in closed position and the electric circuit to the heater 17 is complete. When the heater has heated the ammonium hydroxide in the tank 13, a mixture of ammonia and steam will pass out through the pipe 14 and pipe 30 into the hollow members 25 of the separating device. The tank 24 of the separating device is full of water and this water will cool and condense the steam passing through the members 25 while the ammonia gas passes on through the pipe 36 and into the coil 29. The water condensed in the members 25 passes down through the tubes 31 and check valves 35 and through the check valve 34 into the pipe 30 thence back into the tank 13. The ammonia gas passing on through the coil 29 is cooled by the water in the tank 27 and collects in liquid form in the reeciving coil 28. Any moisture passing over into the coil 29 with the ammonia will condense in the first few convolutions and drain through the tubes 41 into the pipe 42 and back to the pipe 14 and tank 13. In this way it will be seen that only the pure ammonia accumulates within the receiving coil 28. This continues until the charge in the boiler 13 is exhausted and its temperature reaches 273° Fahrenheit at which point the thermostat 18 opens and breaks the circuit to the electric heater. The boiler now begins to cool and to reabsorb ammonia, but owing to the various checking valves interposed throughout the system, ammonia can be drawn into this tank 13 only by way of the expansion coil 11, the liquid being drawn by suction from the receiving coil 28 through the pipe 39 and valve 40, through the coil 11, pipe 12 and check valve 16 and thence into the tank 13. The valve 40 operates to control the pressure. The expansion of the ammonia passing through the coil 11 causes it to absorb the heat from the brine, thus producing the desired refrigerating effect. When the boiler has become cooled and has reabsorbed all the ammonia, the thermostats 18 and 21 again close for energizing the electric heater, thus completing the cycle of operation.

The extension of the pipe 12 into the tank 13 and the perforations constitute an important feature as all the gas that returns from the expansion coils must pass directly through the water, thus preventing any air in the system from "cushioning" down on the water and slowing up reabsorption.

From the foregoing description and a study of the drawings it will be apparent that I have thus provided a very simple and novel method of and apparatus for producing refrigeration without ice, there being no necessity for the employment of any pumps or other positive circulating device, the circulation being effected purely by absorption.

While I have shown and described the preferred embodiment of my invention it is of course to be understood that I reserve the right to make such changes in the form, construction and arrangement of parts as will not depart from the spirit of the invention or the scope of the subjoined claims.

I claim:

1. In an apparatus of the character described, a separator comprising a tank adapted to be filled with cooling liquid, a plurality of hollow members located within the tank, an inlet pipe leading to the bottom of the first one of the plurality of hollow members, pipes connecting the successive ones of said hollow members alternately at the top and bottom thereof, an outlet pipe leading from the top of the last one of the plurality of hollow members, a return pipe leading to said inlet pipe and connected with the bottoms of the respective hollow members, and check valves interposed in said connections.

2. In an apparatus of the character described, a separator comprising a tank adapted to be filled with cooling liquid, a plurality of spaced parallel upright hollow members located within the tank in spaced relation to the walls thereof, an inlet pipe leading to the bottom of the first one of the plurality of hollow upright members, pipes connecting successive ones of said hollow upright members alternately at the upper and lower portions thereof, an outlet pipe leading from the top of the last one of the plurality of hollow upright members, and a return pipe having check valved communication with all of the hollow upright members and connected with said inlet pipe.

In testimony whereof I affix my signature.

FORREST L. BRYANT.